United States Patent
Tang

(10) Patent No.: US 7,957,079 B2
(45) Date of Patent: Jun. 7, 2011

(54) OPTICAL LENS SYSTEM FOR TAKING IMAGE

(75) Inventor: Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/977,063

(22) Filed: Dec. 23, 2010

(65) Prior Publication Data

US 2011/0090572 A1    Apr. 21, 2011

Related U.S. Application Data

(62) Division of application No. 12/346,802, filed on Dec. 30, 2008.

(30) Foreign Application Priority Data

Oct. 16, 2008 (TW) .................. 97139702 A

(51) Int. Cl.
*G02B 3/02* (2006.01)
*G02B 9/34* (2006.01)

(52) U.S. Cl. ........................ 359/773; 359/715
(58) Field of Classification Search .......... 359/715, 359/771, 772, 773, 738, 739
See application file for complete search history.

(56) References Cited

U.S. PATENT DOCUMENTS 7,764,442 B2 * 7/2010 Teraoka et al. ............... 359/773
* cited by examiner

*Primary Examiner* — Jack Dinh

(57) ABSTRACT

An optical lens system for taking image comprises: in order from the object side to the image side: an aperture stop; a first lens element with positive refractive power having a convex object-side surface, a second lens element with negative refractive power; a third lens element with positive refractive power having a concave object-side surface and a convex image-side surface; a plastic fourth lens element with negative refractive power having a concave image-side surface, the object-side and the image-side surfaces of the fourth lens element being aspheric. A focal length of the optical lens system for taking image is f, a focal length of the first lens element and the second lens element combined is f12, and they satisfy the relation: 0.98<f/f12<1.82.

11 Claims, 10 Drawing Sheets

US 7,957,079 B2

OPTICAL LENS SYSTEM FOR TAKING IMAGE

This application is a divisional application of U.S. patent application Ser. No. 12/346,802 which claims the benefit of the earlier filing date of Dec. 30, 2008. Claims 1-11 of this application correspond to the previous claims 13-23 of the U.S. patent application Ser. No. 12/346,802.

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements: from the object side to the image side: a first lens element with positive refractive power, a second lens element with negative refractive power and a third lens element with positive refractive power, such as the optical lens system for taking image described in U.S. Pat. No. 7,145,736.

As the pixel size of electronic imaging sensors gradually becomes smaller and smaller, the system requires higher image quality. The conventional optical lens system comprising three lens elements cannot satisfy the requirements of higher resolution optical lens systems.

U.S. Pat. No. 7,277,238 discloses a four-piece lens assembly, which has a higher resolution than that of the three-piece lens assembly, however, the fourth lens element of the above patent is positive so that the principal point is close to the image side of the system, so the back focal length of such a four-piece lens assembly is relatively longer than that of a telephoto type four-piece lens assembly which has a fourth lens element with negative refractive power. In addition, only the second lens element is negative, so it will be difficult to correct the Petzval sum of the system, making it more difficult to control image quality of the periphery of the image.

The present invention mitigates and/or obviates the aforementioned disadvantages.

SUMMARY OF THE INVENTION

The primary objective of the present invention is to provide an optical lens system for taking image comprising four lens elements to improve image quality, and effectively reduce the volume of the optical lens system.

According to one aspect of the present invention, an optical lens system for taking image in accordance with the present invention comprises: in order from the object side to the image side: an aperture stop; a first lens element with positive refractive power having a convex object-side surface; a second lens element with negative refractive power; a third lens element with positive refractive power having a concave object-side surface and a convex image-side surface; and a fourth lens element with negative refractive power having a concave image-side surface, the fourth lens element can be plastic, the object-side surface and the image-side surface of the fourth lens element can be aspheric. Such arrangements can effectively improve image quality of the system.

By alternating lens elements with positive and negative refractive powers in the above-mentioned telephoto type system, the total track length of the optical lens system can be effectively reduced. The first lens element provides a positive refractive power, and the aperture stop is located in front of the first lens element, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. The inflection point formed on the image-side surface of the fourth lens element will contribute to a better correction of the incident angle of the off axis light with respect to the sensor. And the inflection point formed on the object-side surface of the second lens element can effectively correct the coma aberration caused by the system.

According to another aspect of the present invention, in the present optical lens system for taking image, the image-side surface of the first lens element can be convex or planar or concave. If the image-side surface of the first lens element is convex, the first lens element is a biconvex lens element, such that the refractive power of the first lens element can be effectively increased, and the total track length of the optical lens system will become much shorter. If the image-side surface of the first lens element is planar, the first lens element is a convex-plano lens element, it will be favorable to correct the spherical aberration caused by the system. If the image-side surface of the first lens element is concave, the first lens element is a meniscus lens element, it will be favorable to correct the astigmatism caused by the system.

In the present optical lens system for taking image, the object-side surface of the fourth lens element can be convex or concave. If the object-side surface of the fourth lens element is convex, the fourth lens element is a meniscus lens element, it will be favorable to further correct various aberrations caused by the system. If the object-side surface of the fourth lens element is concave, the fourth lens element is a biconcave lens element, such that the negative refractive power of the fourth lens element will become much larger, the principal point will be further far away from the image plane, and the total track length of the optical lens system will become much shorter.

According to another aspect of the present invention, in the present optical lens system for taking image, the on-axis distance between the second lens element and the third lens element is T23, the focal length of the optical lens system for taking image is f, and they satisfy the relation:

$(T23/f)*100<25$.

The above relation is favorable to correct the astigmatism caused by the system.

According to another aspect of the present invention, in the present optical lens system for taking image, the lens elements can be made of glass or plastic. If the lens elements are made of glass, there is more freedom in distributing the refractive power of the optical lens system. If the lens elements are made of plastic, the cost will be effectively reduced.

In the present optical lens system for taking image, the lens elements can be provided with aspheric surfaces, allowing more design parameters (than spherical surfaces), so as to better correct aberrations, resulting in a reduction in the number of the lens elements, and thus effectively reducing the total track length of the optical lens system.

According to another aspect of the present invention, in the present optical lens system for taking image, the focal length of the optical lens system for taking image is f, the focal length of the first lens element and the second lens element combined is f12, and they satisfy the relation:

$$0.98 < f/f12 < 1.82.$$

If the value of f/f12 is smaller than the above lower limit, the refractive power of the system will be relatively weak, the total track length of the system will be longer. And if the value of f/f12 is greater than the above upper limit, the higher order aberrations of the system will be too large. Further, it will be better if f/f12 satisfies the relation:

$$1.28 < f/f12 < 1.68.$$

According to another aspect of the present invention, in the present optical lens system for taking image, the focal length of the optical lens system for taking image is f, the focal length of the first lens element is f1, and they satisfy the relation:

$$1.35 < f/f1 < 2.60.$$

If the value of f/f1 is smaller than the above lower limit, the refractive power of the system will be relatively weak, the total track length of the system will be longer, and it will be difficult to suppress the incident angle of the light with respect to the sensor; if the value of f/f1 is greater than the above upper limit, it will be difficult to correct the higher order aberrations of the system. Further, it will be better if f/f1 satisfies the relation:

$$1.55 < f/f1 < 2.45.$$

According to another aspect of the present invention, in the present optical lens system for taking image, the focal length of the optical lens system for taking image is f, the focal length of the third lens element is f3, and they satisfy the relation:

$$0.45 < f/f3 < 0.82.$$

If the value of f/f3 satisfies the above relation, the refractive power of the optical lens system can be effectively distributed and additional higher order aberrations will not be produced. Further, it will be better if f/f3 satisfies the relation:

$$0.55 < f/f3 < 0.75.$$

According to another aspect of the present invention, in the present optical lens system for taking image, the focal length of the optical lens system for taking image is f, the focal length of the fourth lens element is f4, and they satisfy the relation:

$$0.50 < |f/f4| < 1.50.$$

If the value of |f/f4| satisfies the above relation, a balance can be obtained between the correction of aberrations and the reduction of the total track length. Further, it will be better if |f/f4| satisfies the relation:

$$0.63 < |f/f4| < 1.20.$$

According to another aspect of the present invention, in the present optical lens system for taking image, the focal length of the optical lens system for taking image is f, the on-axis distance between the first lens element and the second lens element is T12, the on-axis distance between the second lens element and the third lens element is T23, the on-axis distance between the third lens element and the fourth lens element is T34, and they satisfy the relations:

$$(T12/f)*100 > 0.4,$$

$$3.5 < (T34/f)*100 < 12.$$

The above relation can allow better correction of the astigmatism of the system.

According to another aspect of the present invention, in the present optical lens system for taking image, the refractive index of the first lens element is N1, the refractive index of the second lens element is N2, and they satisfy the relation:

$$|N1-N2| < 0.108.$$

The above relation can allow better correction of the astigmatism of the system.

According to another aspect of the present invention, in the present optical lens system for taking image, the Abbe number of the first lens element is V1, the Abbe number of the second lens element is V2, and they satisfy the relation:

$$|V1-V2| > 23.$$

The above relation is favorable to correcting the chromatic aberration caused by the system.

According to another aspect of the present invention, in the present optical lens system for taking image, the refractive index of the first lens element is N1, the refractive index of the second lens element is N2, and they satisfy the relations:

$$1.50 < N1 < 1.58,$$

$$1.55 < N2 < 1.64$$

If N1 and N2 satisfy the above relations, it is easy to find suitable plastic material to match the optical lens system.

According to another aspect of the present invention, in the present optical lens system for taking image, the focal length of the optical lens system for taking image is f, the radius of curvature of the object-side surface of the first lens element is R1, and they satisfy the relation:

$$0 < R1/f < 0.4.$$

The above relation can effectively improve the refractive power of the first lens element, such that a relatively high refractive power of the optical lens system can be obtained, thus reducing the total track length of the optical lens system. Further, it will be better if R1/f satisfies the relation:

$$0 < R1/f < 0.32.$$

According to another aspect of the present invention, in the present optical lens system for taking image, the radius of curvature of the object-side surface of the second lens element is R3, the radius of curvature of the image-side surface of the second lens element is R4, and they satisfy the relation:

$$-0.40 < (R3+R4)/(R3-R4) < 0.85.$$

The above relation can correct the Petzval sum of the system. Further, it will be better if R3 and R4 satisfy the relation:

$$-0.35 < (R3+R4)/(R3-R4) < 0.5.$$

Further, it will be much better if R3 and R4 satisfy the relation:

$$-0.09 < (R3+R4)/(R3-R4) < 0.15.$$

According to another aspect of the present invention, in the present optical lens system for taking image, the distance from the aperture stop of the optical lens system for taking image to the image plane is DT, including a flat glass between the image-side surface of the fourth lens element and the image plane. A maximum image height of the optical lens system for taking image is ImgH, which is half of the length of the diagonal line of the effective pixel region of the electronic imaging sensor, and it satisfies the relation:

DT/ImgH<2.0. And an object to be photographed is imaged on the electronic imaging sensor.

The above relation can maintain the objective of miniaturization of the optical lens system for taking image. Further, it will be better if DT/ImgH satisfies the relation:

DT/ImgH<1.84.

Further, it will be much better if DT/ImgH satisfies the relation:

DT/ImgH<1.78.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
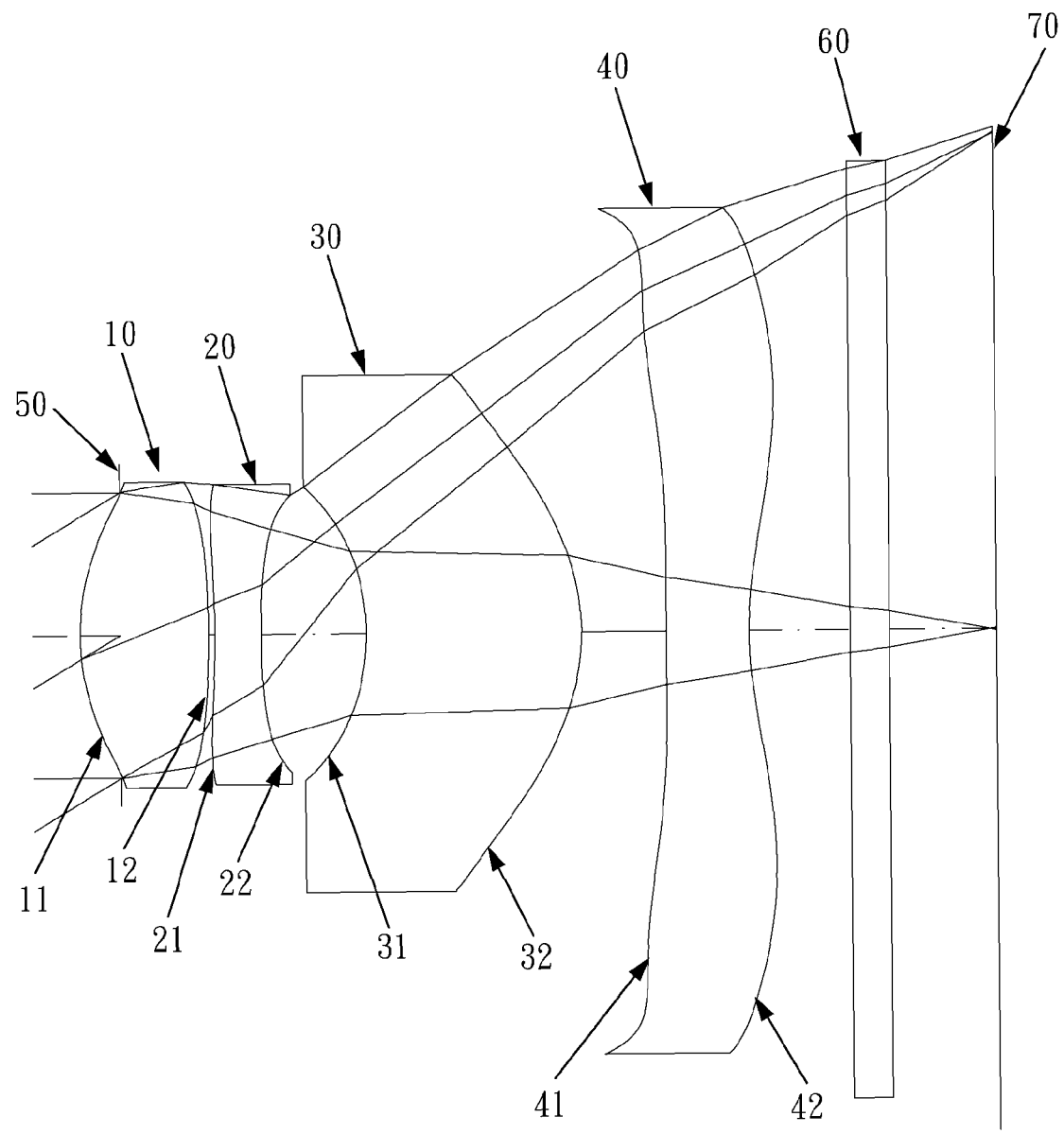
FIG. 1A shows an optical lens system for taking image in accordance with a first embodiment of the present invention.
Figure 1B:
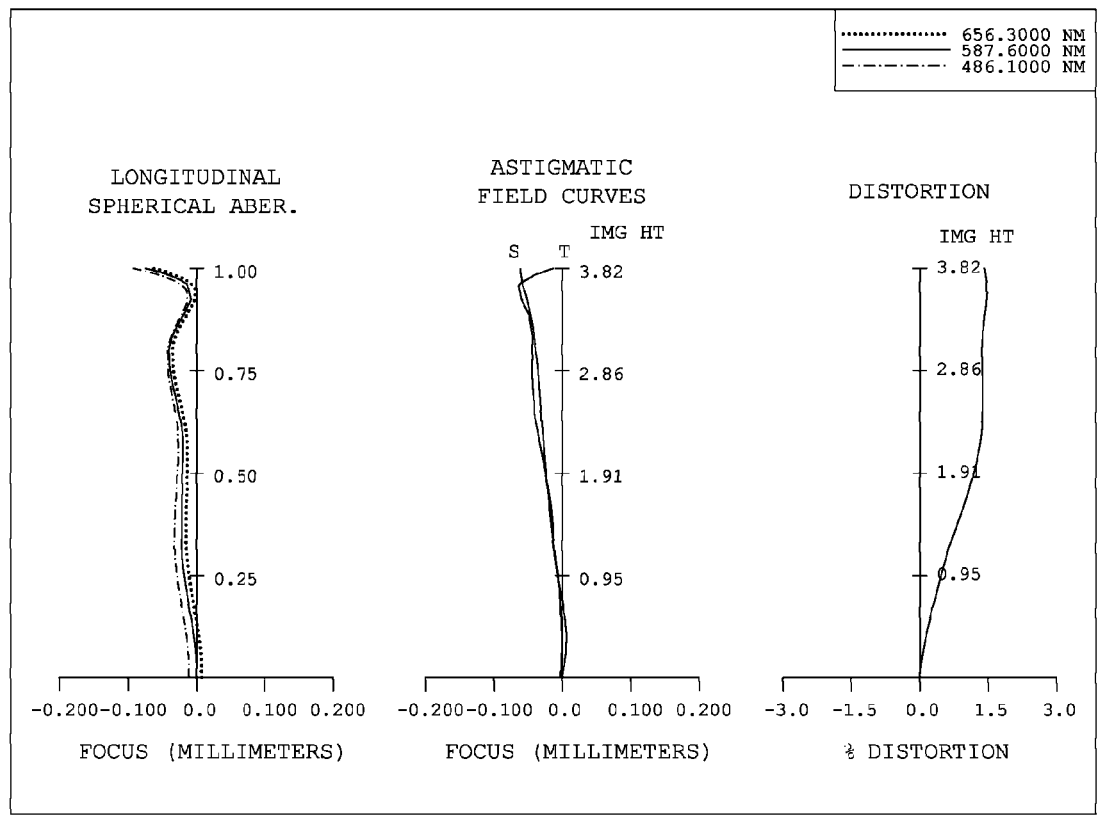
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and inflection points are formed on the object-side surface 21.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

An image plane 70 is located behind the IR cut filter 60.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the third lens element is f3, the focal length of the fourth lens element is f4, the focal length of the first lens element and the second lens element combined is f12, the on-axis distance between the first lens element and the second lens element is T12, the on-axis distance between the second lens element and the third lens element is T23, the on-axis distance between the third lens element and the fourth lens element is T34, and they satisfy the relations:

f=6.26 mm;

f/f12=1.33;

f/f1=2.15;

f/f3=0.70;

|f/f4|=1.00;

(T12/f)*100=0.8;

(T23/f)*100=12.9;

(T34/f)*100=10.4.

In the first embodiment of the present optical lens system for taking image, the refractive index of the first lens element is N1, the refractive index of the second lens element is N2, and they satisfy the relations:

N1=1.544;

N2=1.632;

|N1−N2|=0.088.

In the first embodiment of the present optical lens system for taking image, the Abbe number of the first lens element is V1, the Abbe number of the second lens element is V2, and they satisfy the relation:

|V1−V2|=32.5.

In the first embodiment of the present optical lens system for taking image, the focal length of the optical lens system for taking image is f, the radius of curvature of the object-side surface of the first lens element is R1, the radius of curvature of the object-side surface of the second lens element is R3, the radius of curvature of the image-side surface of the second lens element is R4, and they satisfy the relations:

$R1/f=0.30;$ $(R3+R4)/(R3-R4)=-0.07.$

In the first embodiment of the present optical lens system for taking image, the distance from the aperture stop of the optical lens system for taking image to the image plane is DT, the maximum image height of the optical lens system for taking image is ImgH, and they satisfy the relation: DT/ImgH=1.77. And an object to be photographed is imaged on the electronic imaging sensor.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 6.26 mm, Fno = 2.85, HFOV (half of field of view) = 31.1 deg.

| Surface # |  | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.310 | | | | |
| 2 | Lens 1 | 1.86996(ASP) | 0.986 | Plastic | 1.544 | 55.9 | 2.91 |
| 3 | | −8.38480(ASP) | 0.050 | | | | |
| 4 | Lens 2 | −6.94910(ASP) | 0.357 | Plastic | 1.632 | 23.4 | −5.83 |
| 5 | | 7.99520 (ASP) | 0.810 | | | | |
| 6 | Lens 3 | −1.79686(ASP) | 1.656 | Plastic | 1.530 | 55.8 | 9.00 |
| 7 | | −1.72197(ASP) | 0.650 | | | | |
| 8 | Lens 4 | 22.50670(ASP) | 0.640 | Plastic | 1.530 | 55.8 | −6.26 |
| 9 | | 2.86397(ASP) | 0.780 | | | | |
| 10 | IR-filter | Plano | 0.300 | Glass | 1.517 | 64.2 | |
| 11 | | Plano | 0.830 | | | | |
| 12 | Image | Plano | | | | | |

TABLE 2

Aspheric Coefficients

| Surface # | 2 | 3 | 4 | 5 |
|---|---|---|---|---|
| k= | −2.66615E−01 | −1.51624E+02 | −1.14659E+02 | 3.75434E+01 |
| A4= | 3.22568E−03 | −4.19545E−02 | 2.34538E−02 | 7.33400E−02 |
| A6= | −1.77280E−02 | −1.47190E−02 | −4.55841E−03 | 9.16553E−03 |
| A8= | 1.86986E−02 | 3.32872E−03 | 7.15290E−03 | −9.71964E−03 |
| A10= | −1.62027E−02 | −3.34897E−03 | 1.87828E−03 | 2.45689E−02 |

| Surface# | 6 | 7 | 8 | 9 |
|---|---|---|---|---|
| k= | −1.21750E+00 | −8.04145E−01 | −2.26437E+03 | −1.18463E+01 |
| A4= | −5.74960E−02 | 1.50268E−02 | −2.20145E−02 | −1.94216E−02 |
| A6= | −1.38256E−02 | −3.51815E−03 | 3.93530E−03 | 2.46065E−03 |
| A8= | −4.04019E−03 | 8.23217E−04 | −1.45084E−04 | −2.47010E−04 |
| A10= | 3.34425E−03 | 1.11401E−04 | −1.45051E−05 | 1.20212E−05 |
| A12= | −9.08575E−04 | 3.01279E−05 | 4.22885E−07 | 3.24679E−07 |
| A14= | −2.20823E−04 | −2.93242E−06 | 1.74396E−07 | −2.11767E−08 |
| A16= | 6.81756E−05 | −2.43440E−06 | −1.39109E−08 | −1.96548E−09 |

Figure 2A:
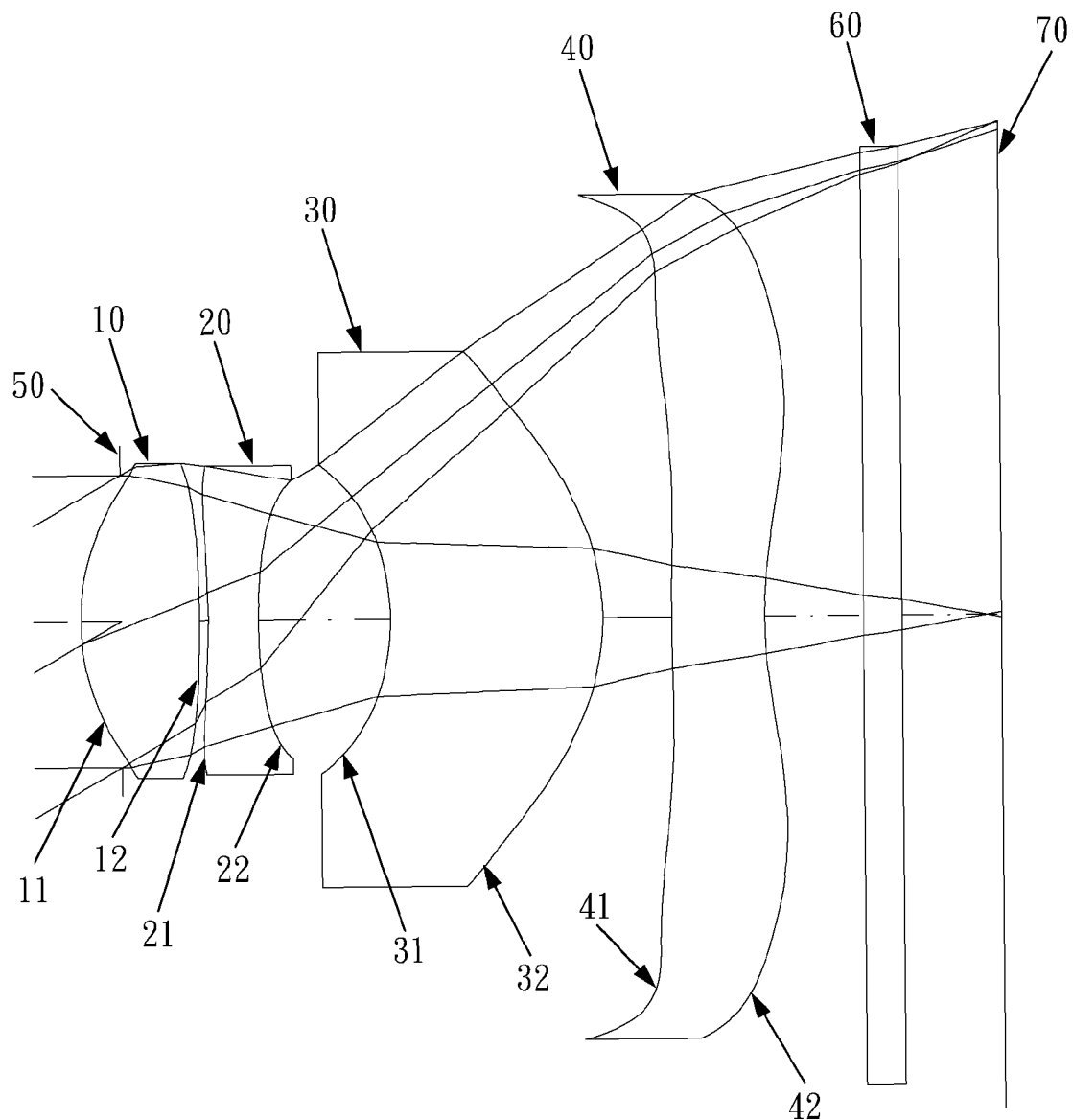
FIG. 2A shows an optical lens system for taking image in accordance with a second embodiment of the present invention.
Figure 2B:
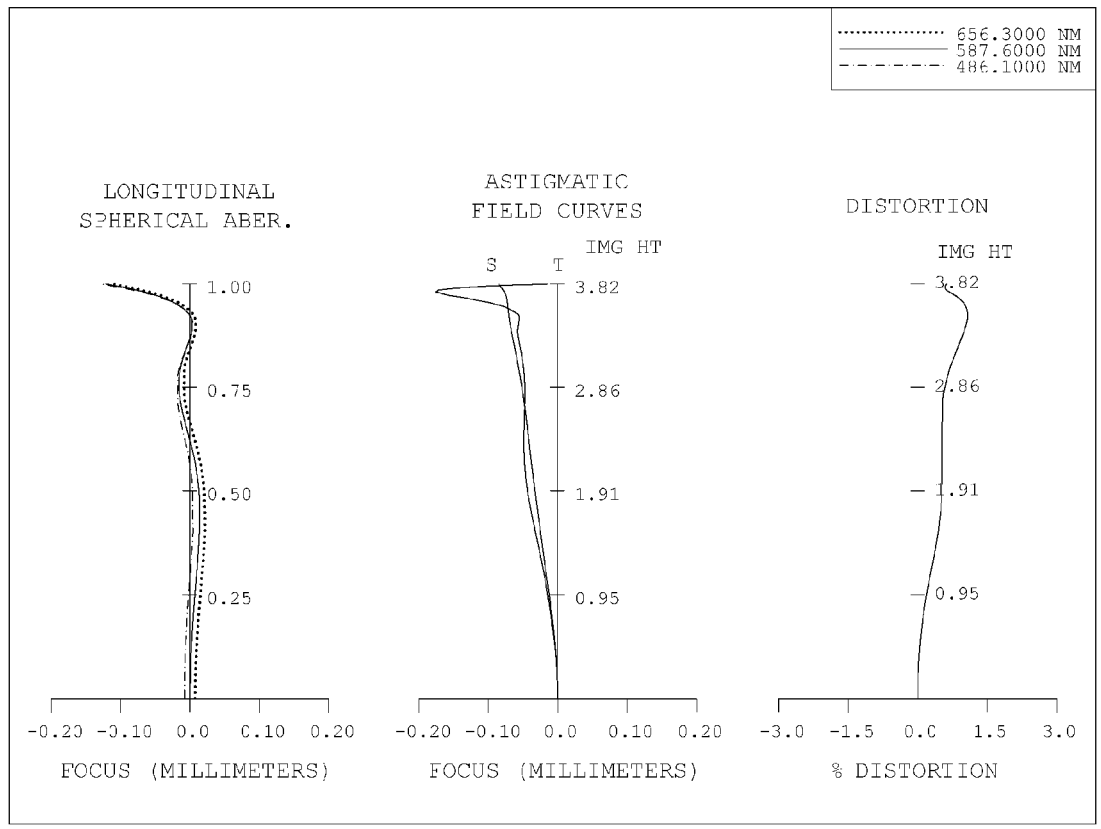
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and inflection points are formed on the object-side surface 21.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the third lens element is f3, the focal length of the fourth lens element is f4, the focal length of the first lens element and the second lens element combined is f12, the on-axis distance between the first lens element and the second lens element is T12, the on-axis distance between the second lens element and the third lens element is T23, the on-axis distance between the third lens element and the fourth lens element is T34, and they satisfy the relations:

f=6.59 mm;

$f/f12=1.29$;

$f/f1=2.32$;

$f/f3=0.62$;

$|f/f4|=0.84$;

$(T12/f)*100=1.1$;

$(T23/f)*100=15.7$;

$(T34/f)*100=8.2$.

In the second embodiment of the present optical lens system for taking image, the refractive index of the first lens element is N1, the refractive index of the second lens element is N2, and they satisfy the relations:

N1=1.544;

N2=1.608;

$|N1-N2|=0.064$.

In the second embodiment of the present optical lens system for taking image, the Abbe number of the first lens element is V1, the Abbe number of the second lens element is V2, and they satisfy the relation:

$|V1-V2|=30.3$.

In the second embodiment of the present optical lens system for taking image, the focal length of the optical lens system for taking image is f, the radius of curvature of the object-side surface of the first lens element is R1, the radius of curvature of the object-side surface of the second lens element is R3, the radius of curvature of the image-side surface of the second lens element is R4, and they satisfy the relations:

$R1/f=0.28$;

$(R3+R4)/(R3-R4)=0.10$.

In the second embodiment of the present optical lens system for taking image, the distance from the aperture stop of the optical lens system for taking image to the image plane is DT, the maximum image height of the optical lens system for taking image is ImgH, and they satisfy the relation:

DT/ImgH=1.82. And an object to be photographed is imaged on the electronic imaging sensor.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 6.59 mm, Fno = 2.85, HFOV (half of field of view) = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.319 | | | | |
| 2 | Lens 1 | 1.80904(ASP) | 0.934 | Plastic | 1.544 | 55.9 | 2.84 |
| 3 | | −8.71480(ASP) | 0.070 | | | | |
| 4 | Lens 2 | −6.53810(ASP) | 0.399 | Plastic | 1.608 | 25.6 | −4.76 |
| 5 | | 5.31970 (ASP) | 1.036 | | | | |
| 6 | Lens 3 | −1.95744(ASP) | 1.674 | Plastic | 1.530 | 55.8 | 10.71 |
| 7 | | −1.88643(ASP) | 0.543 | | | | |
| 8 | Lens 4 | 14.40200(ASP) | 0.730 | Plastic | 1.530 | 55.8 | −7.83 |
| 9 | | 3.16340(ASP) | 0.780 | | | | |
| 10 | IR-filter | Plano | 0.300 | Glass | 1.517 | 64.2 | |
| 11 | | Plano | 0.786 | | | | |
| 12 | Image | Plano | | | | | |

TABLE 4

Aspheric Coefficients

| Surface # | 2 | 3 | 4 | 5 |
|---|---|---|---|---|
| k= | −1.85763E−01 | −3.58739E+02 | −1.70795E+02 | 1.47608E+01 |
| A4= | 2.62029E−03 | −2.31797E−02 | 6.60629E−03 | 4.95303E−02 |
| A6= | −2.74456E−03 | −1.07309E−02 | −1.43853E−02 | 3.30239E−03 |

TABLE 4-continued

| | Aspheric Coefficients | | | |
|---|---|---|---|---|
| A8= | 6.80837E−03 | 2.94374E−03 | 1.49659E−02 | −1.16095E−02 |
| A10= | −7.98348E−03 | −1.74203E−03 | 7.33430E−04 | 2.60410E−02 |

| Surface# | 6 | 7 | 8 | 9 |
|---|---|---|---|---|
| k= | −1.36276E+00 | −7.04278E−01 | −3.60327E+02 | −1.26220E+01 |
| A4= | −5.47920E−02 | 9.77416E−03 | −2.15929E−02 | −2.09798E−02 |
| A6= | −1.58679E−02 | −2.87642E−03 | 3.81409E−03 | 2.48696E−03 |
| A8= | −5.50328E−03 | 6.47202E−04 | −1.36033E−04 | −2.46666E−04 |
| A10= | 3.54674E−03 | 5.31299E−05 | −1.34563E−05 | 1.28619E−05 |
| A12= | −9.18584E−04 | 1.76272E−05 | 3.22320E−07 | 4.59302E−07 |
| A14= | −2.24921E−04 | −2.63327E−07 | 1.41414E−07 | −4.24480E−08 |
| A16= | 6.81756E−05 | −1.18913E−06 | −1.14144E−08 | −2.20005E−09 |

Figure 3A:
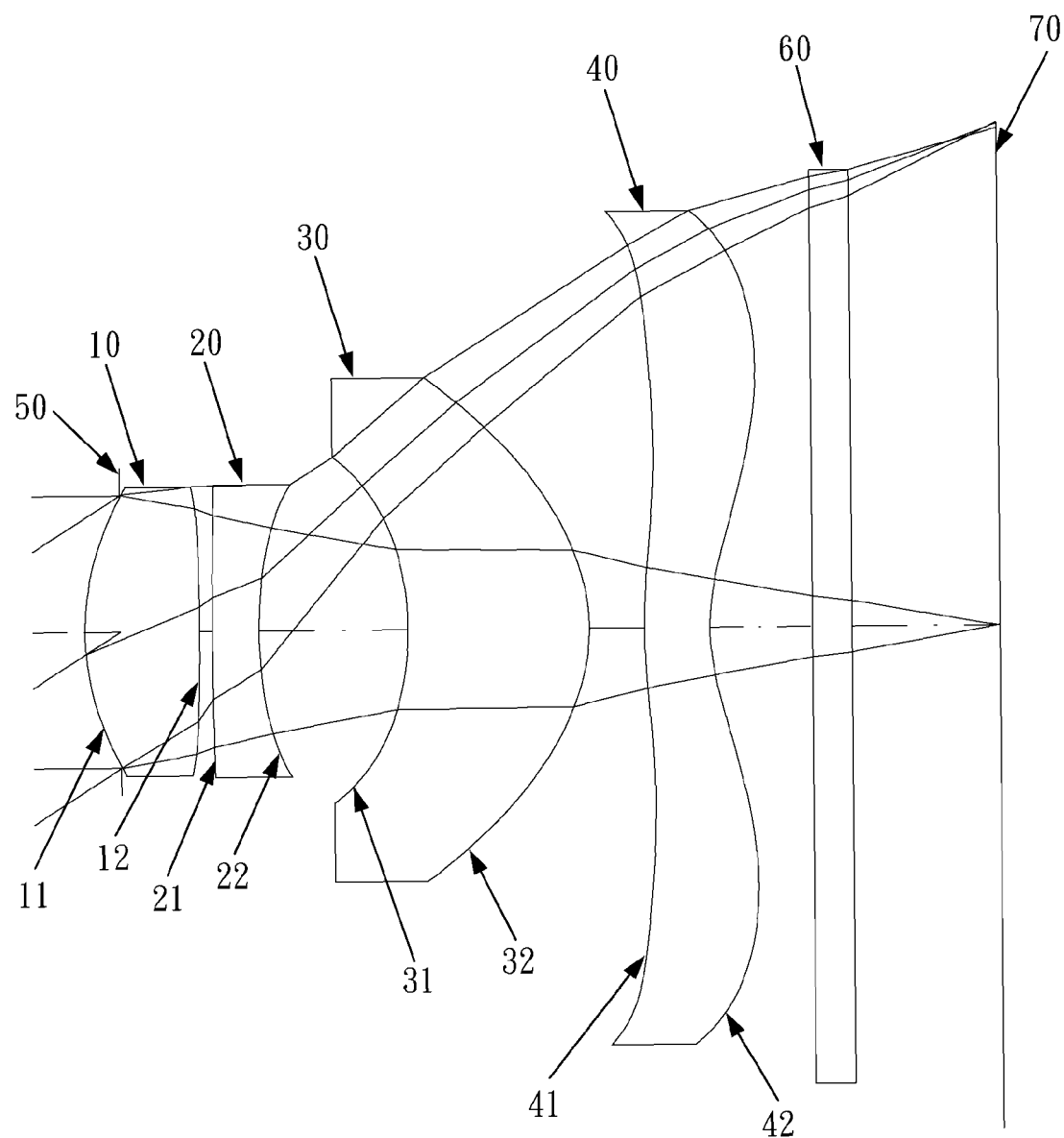
FIG. 3A shows an optical lens system for taking image in accordance with a third embodiment of the present invention.
Figure 3B:
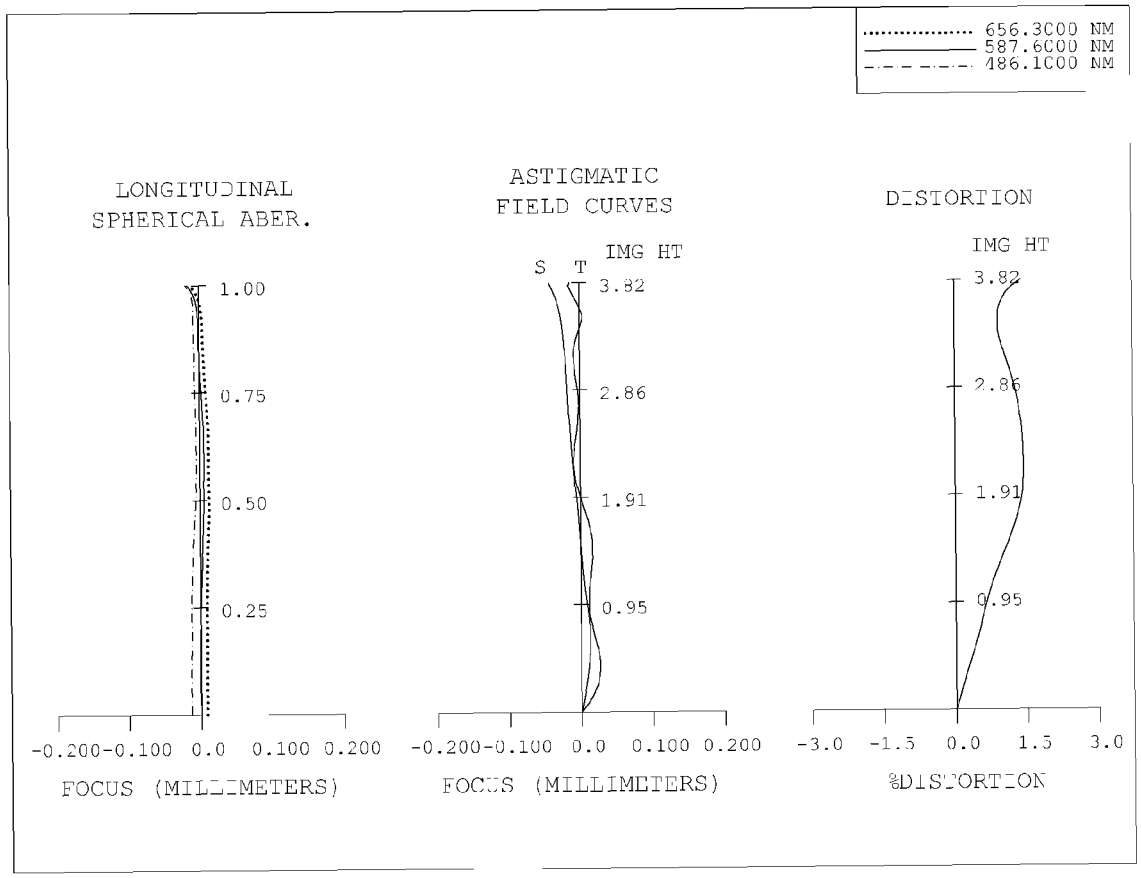
FIG. 3B shows the aberration curves of the third embodiment of the present invention.

Referring to FIG. 3A, which shows an optical lens system for taking image in accordance with a third embodiment of the present invention, FIG. 3B shows the aberration curves of the third embodiment of the present invention. The third embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

An image plane 70 is located behind the IR cut filter 60.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the third lens element is f3, the focal length of the fourth lens element is f4, the focal length of the first lens element and the second lens element combined is f12, the on-axis distance between the first lens element and the second lens element is T12, the on-axis distance between the second lens element and the third lens element is T23, the on-axis distance between the third lens element and the fourth lens element is T34, and they satisfy the relations:

$f = 5.93$ mm;

$f/f12 = 0.96$;

$f/f1 = 1.70$;

$f/f3 = 1.23$;

$|f/f4| = 1.11$;

$(T12/f) \ast 100 = 1.7$;

$(T23/f) \ast 100 = 19.1$;

$(T34/f) \ast 100 = 7.1$.

In the third embodiment of the present optical lens system for taking image, the refractive index of the first lens element is N1, the refractive index of the second lens element is N2, and they satisfy the relations:

$N1 = 1.544$;

$N2 = 1.632$;

$|N1 - N2| = 0.088$.

In the third embodiment of the present optical lens system for taking image, the Abbe number of the first lens element is V1, the Abbe number of the second lens element is V2, and they satisfy the relation:

$|V1 - V2| = 32.5$.

In the third embodiment of the present optical lens system for taking image, the focal length of the optical lens system for taking image is f, the radius of curvature of the object-side surface of the first lens element is R1, the radius of curvature of the object-side surface of the second lens element is R3, the radius of curvature of the image-side surface of the second lens element is R4, and they satisfy the relations:

$R1/f = 0.34$;

$(R3 + R4)/(R3 - R4) = 1.08$.

In the third embodiment of the present optical lens system for taking image, the distance from the aperture stop of the optical lens system for taking image to the image plane is DT, the maximum image height of the optical lens system for taking image is ImgH, and they satisfy the relation:

DT/ImgH=1.75. And an object to be photographed is imaged on the electronic imaging sensor.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 5.93 mm, Fno = 2.85, HFOV (half of field of view) = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.270 | | | | |
| 2 | Lens 1 | 2.02347(ASP) | 0.868 | Plastic | 1.544 | 55.9 | 3.48 |
| 3 | | −25.33201(ASP) | 0.100 | | | | |
| 4 | Lens 2 | 86.63811(ASP) | 0.356 | Plastic | 1.632 | 23.4 | −6.04 |
| 5 | | 3.64925 (ASP) | 1.131 | | | | |
| 6 | Lens 3 | −2.28859(ASP) | 1.378 | Plastic | 1.530 | 55.8 | 4.79 |
| 7 | | −1.45512(ASP) | 0.420 | | | | |
| 8 | Lens 4 | 3.77664(ASP) | 0.497 | Plastic | 1.530 | 55.8 | −5.31 |
| 9 | | 1.53862(ASP) | 0.780 | | | | |
| 10 | IR-filter | Plano | 0.300 | Glass | 1.517 | 64.2 | |
| 11 | | Plano | 1.123 | | | | |
| 12 | Image | Plano | | | | | |

TABLE 6

Aspheric Coefficients

| Surface # | 2 | 3 | 4 | 5 |
|---|---|---|---|---|
| k= | −1.93392E−01 | −5.55828E+02 | 5.48578E+03 | 2.86059E+00 |
| A4= | 2.30707E−03 | −8.75677E−03 | 1.28975E−02 | 2.54139E−02 |
| A6= | −4.88276E−03 | −1.25516E−02 | −1.27453E−02 | 4.54410E−03 |
| A8= | 4.72661E−03 | 3.05794E−03 | 5.81420E−03 | −1.24823E−03 |
| A10= | −4.67879E−03 | −3.91258E−03 | −1.85302E−03 | 4.56754E−03 |

| Surface# | 6 | 7 | 8 | 9 |
|---|---|---|---|---|
| k= | −1.44728E+00 | −7.81986E−01 | −5.58153E+01 | −7.05109E+00 |
| A4= | −4.40306E−02 | 2.84899E−02 | −2.10640E−02 | −2.34757E−02 |
| A6= | −5.20584E−03 | −7.80416E−03 | 3.39559E−03 | 3.01728E−03 |
| A8= | −5.75901E−03 | 2.47181E−04 | −1.31038E−04 | −2.73458E−04 |
| A10= | 3.20694E−04 | 1.38281E−04 | −1.29130E−05 | 9.48294E−06 |
| A12= | 8.50683E−04 | 4.70225E−05 | 1.13744E−07 | 2.81994E−07 |
| A14= | 5.60588E−04 | 2.90950E−06 | 1.15668E−07 | −3.07557E−08 |
| A16= | −5.85888E−04 | −3.36770E−06 | −5.89772E−09 | −4.28521E−10 |

Figure 4A:
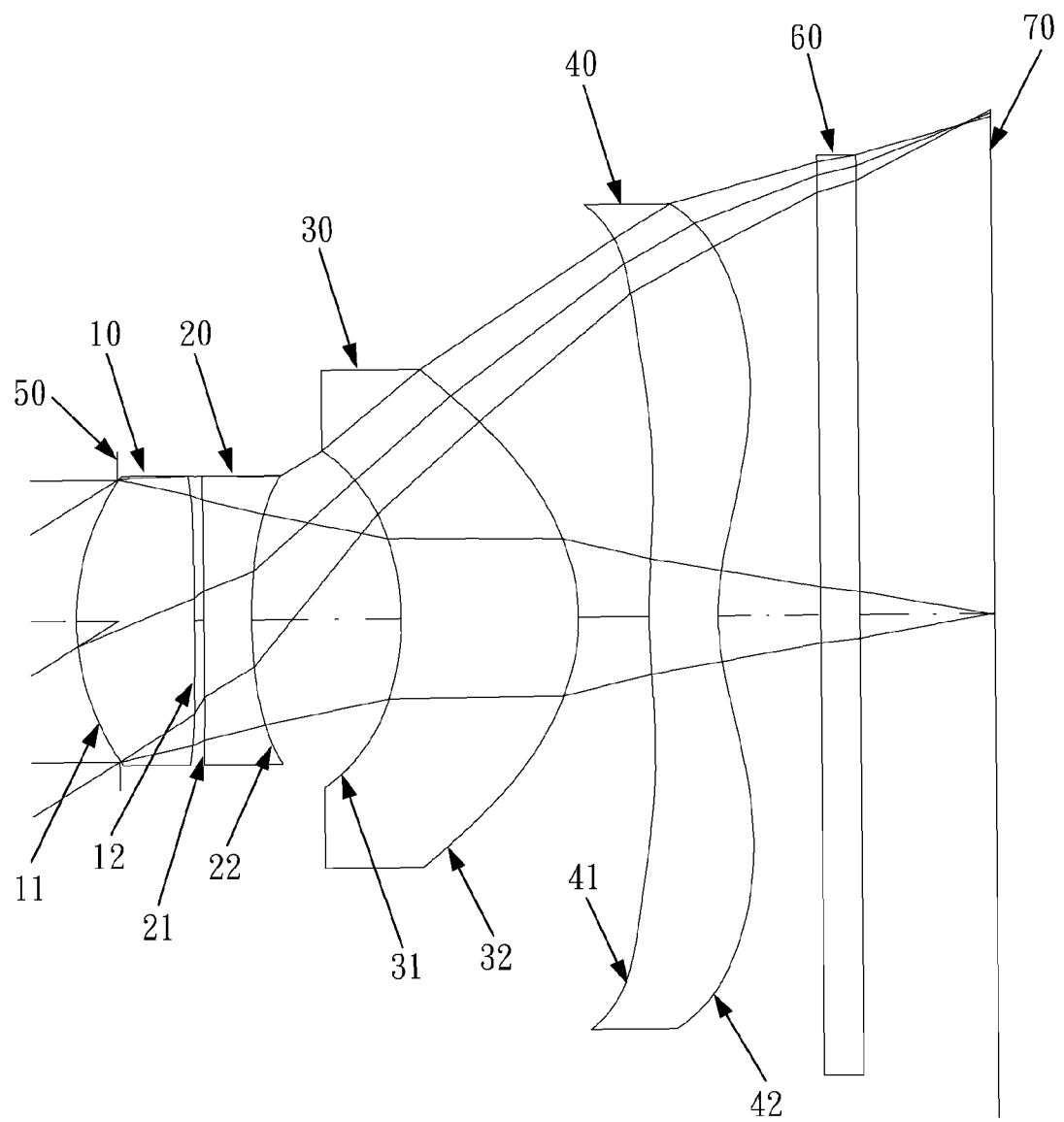
FIG. 4A shows an optical lens system for taking image in accordance with a fourth embodiment of the present invention.
Figure 4B:
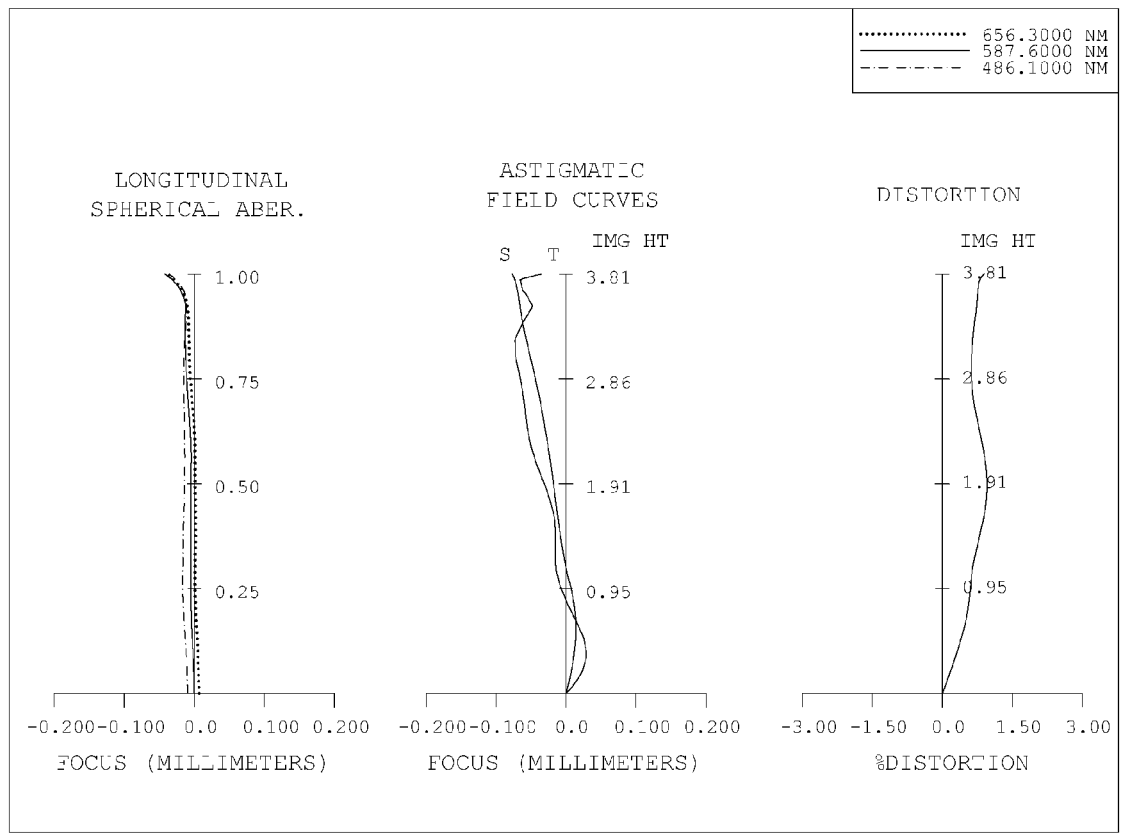
FIG. 4B shows the aberration curves of the fourth embodiment of the present invention.

Referring to FIG. 4A, which shows an optical lens system for taking image in accordance with a fourth embodiment of the present invention, FIG. 4B shows the aberration curves of the fourth embodiment of the present invention. The fourth embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and inflection points are formed on the object-side surface 21.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

An image plane 70 is located behind the IR cut filter 60.

The equation for the aspheric surface profiles of the fourth embodiment has the same form as that of the first embodiment.

In the fourth embodiment of the present optical lens system for taking image, the focal length of the optical lens system for taking image is f, the focal length of the first lens element is f1, the focal length of the third lens element is f3, the focal length of the fourth lens element is f4, the focal length of the first lens element and the second lens element combined is f12, the on-axis distance between the first lens element and the second lens element is T12, the on-axis distance between the second lens element and the third lens element is T23, the on-axis distance between the third lens element and the fourth lens element is T34, and they satisfy the relations:

$f = 6.14$ mm;

$f/f12 = 1.03$;

$f/f1 = 1.84$;

$f/f3=1.07$;

$|f/f4|=1.05$;

$(T12/f)*100=1.2$;

$(T23/f)*100=18.5$;

$(T34/f)*100=8.8$.

In the fourth embodiment of the present optical lens system for taking image, the refractive index of the first lens element is N1, the refractive index of the second lens element is N2, and they satisfy the relations:

N1=1.544;

N2=1.632;

|N1−N2|=0.088.

In the fourth embodiment of the present optical lens system for taking image, the Abbe number of the first lens element is V1, the Abbe number of the second lens element is V2, and they satisfy the relation:

|V1−V2|=32.5.

In the fourth embodiment of the present optical lens system for taking image, the focal length of the optical lens system for taking image is f, the radius of curvature of the object-side surface of the first lens element is R1, the radius of curvature of the object-side surface of the second lens element is R3, the radius of curvature of the image-side surface of the second lens element is R4, and they satisfy the relations:

R1/f=0.31;

(R3+R4)/(R3−R4)=0.78.

In the fourth embodiment of the present optical lens system for taking image, the distance from the aperture stop of the optical lens system for taking image to the image plane is DT, the maximum image height of the optical lens system for taking image is ImgH, and they satisfy the relation:

DT/ImgH=1.75. And an object to be photographed is imaged on the electronic imaging sensor.

The detailed optical data of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 4)
f(focal length) = 6.14 mm, Fno = 2.85, HFOV (half of field of view) = 31.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.324 | | | | |
| 2 | Lens 1 | 1.91107(ASP) | 0.899 | Plastic | 1.544 | 55.9 | 3.33 |
| 3 | | −29.45970(ASP) | 0.073 | | | | |
| 4 | Lens 2 | −32.82630(ASP) | 0.365 | Plastic | 1.632 | 23.4 | −5.69 |
| 5 | | 4.05720 (ASP) | 1.138 | | | | |
| 6 | Lens 3 | −2.11102(ASP) | 1.354 | Plastic | 1.530 | 55.8 | 5.71 |
| 7 | | −1.51931(ASP) | 0.540 | | | | |
| 8 | Lens 4 | 5.12240(ASP) | 0.523 | Plastic | 1.530 | 55.8 | −5.85 |
| 9 | | 1.86351(ASP) | 0.780 | | | | |
| 10 | IR-filter | Plano | 0.300 | Glass | 1.517 | 64.2 | |
| 11 | | Plano | 1.032 | | | | |
| 12 | Image | Plano | | | | | |

TABLE 8

| Aspheric Coefficients | | | | |
|---|---|---|---|---|
| Surface # | 2 | 3 | 4 | 5 |
| k= | −9.12349E−02 | −1.07552E+04 | −1.59296E+04 | 4.10612E+00 |
| A4= | 3.36879E−03 | −8.48082E−03 | 7.84874E−03 | 2.93045E−02 |
| A6= | −6.02694E−05 | −9.08945E−03 | −1.24808E−02 | 4.33748E−03 |
| A8= | 2.12558E−03 | 5.57279E−03 | 8.58581E−03 | −5.64936E−03 |
| A10= | −2.50251E−03 | −5.21655E−03 | −3.02370E−03 | 1.07016E−02 |
| Surface# | 6 | 7 | 8 | 9 |
| k= | −1.69217E+00 | −7.34531E−01 | −1.19382E+02 | −9.26066E+00 |
| A4= | −5.14203E−02 | 1.85378E−02 | −2.55418E−02 | −2.37298E−02 |
| A6= | −1.61437E−02 | −5.49788E−03 | 3.88293E−03 | 2.48234E−03 |
| A8= | 2.83906E−04 | 1.37876E−04 | −8.80418E−05 | −1.98307E−04 |
| A10= | 7.72158E−04 | 9.89693E−05 | −1.42986E−05 | 9.87774E−06 |
| A12= | −8.85615E−04 | 6.08222E−05 | −4.16478E−07 | 1.23240E−07 |
| A14= | −2.13268E−04 | 6.95766E−06 | 8.13481E−08 | −4.01450E−08 |
| A16= | 6.08573E−05 | −3.81889E−06 | −1.59776E−09 | −1.07759E−09 |

Figure 5A:
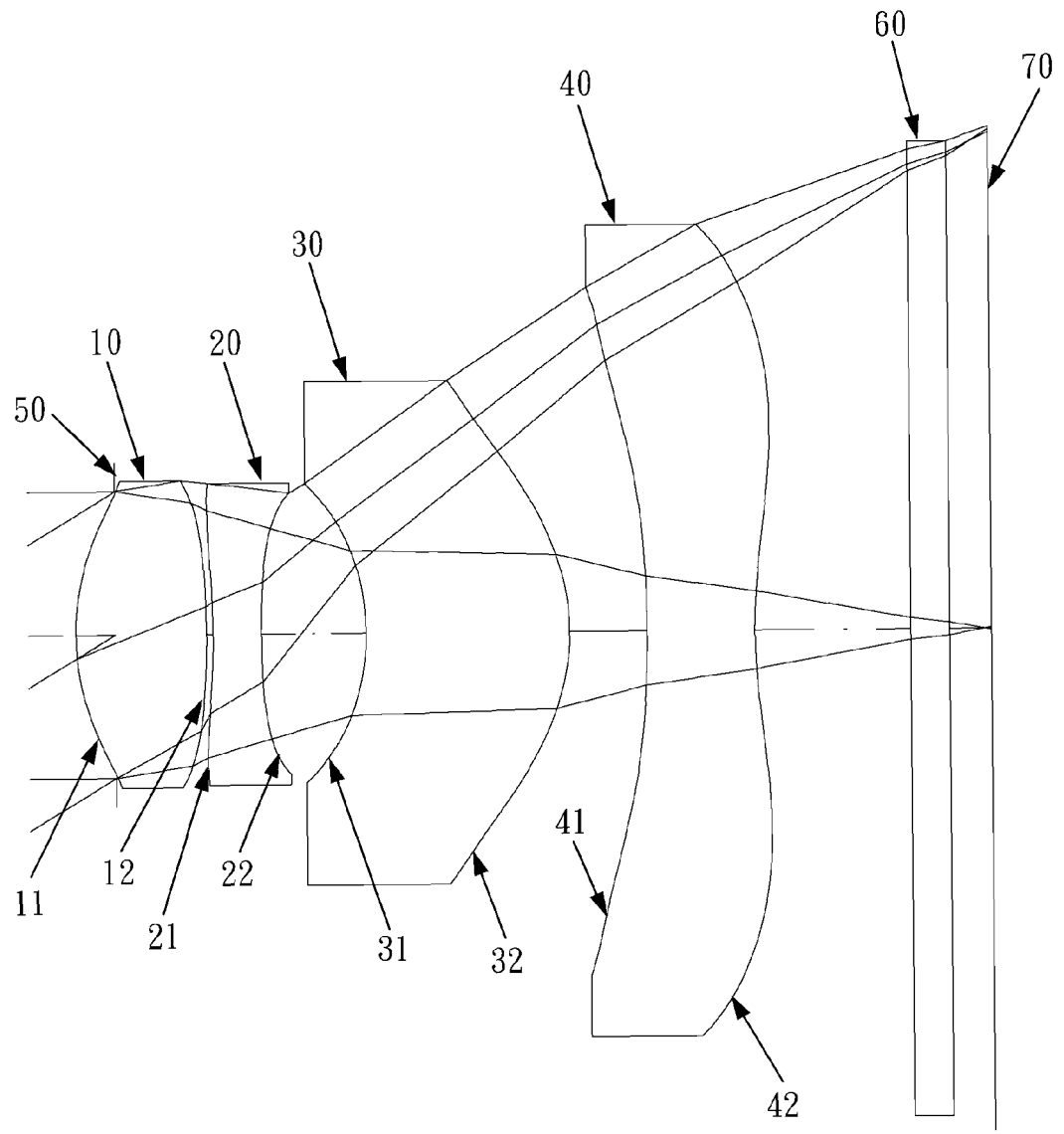
FIG. 5A shows an optical lens system for taking image in accordance with a fifth embodiment of the present invention.
Figure 5B:
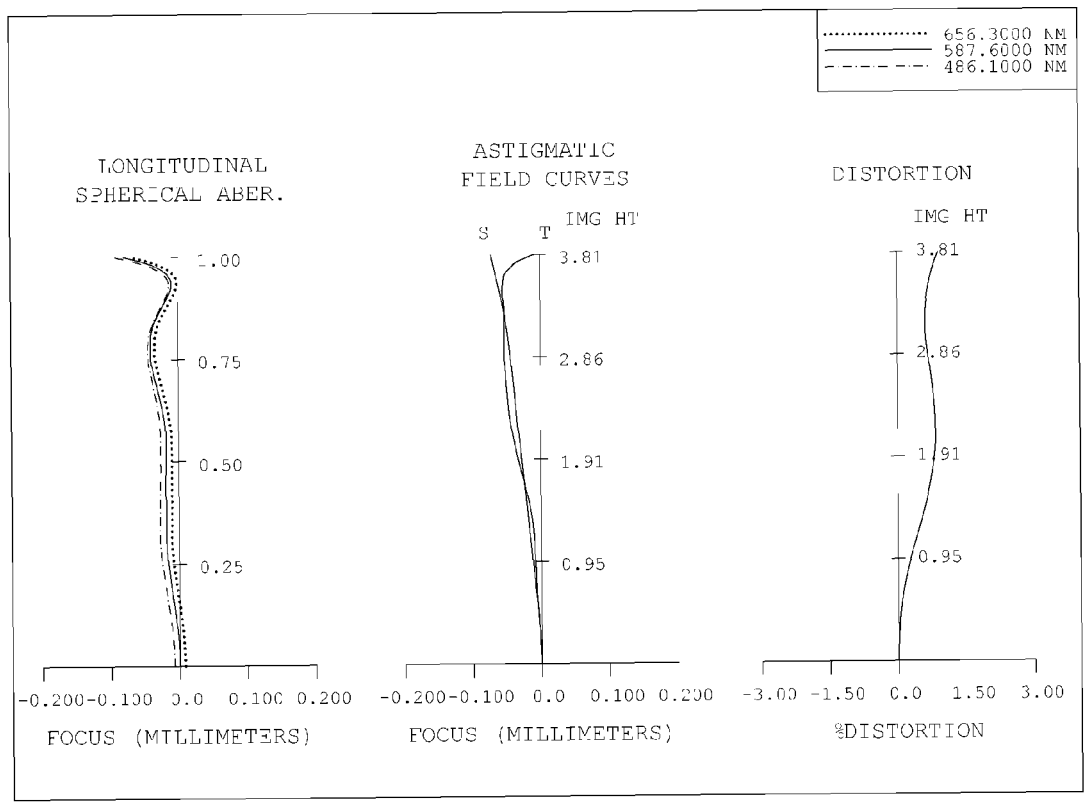
FIG. 5B shows the aberration curves of the fifth embodiment of the present invention.

Referring to FIG. 5A, which shows an optical lens system for taking image in accordance with a fifth embodiment of the present invention, FIG. 5B shows the aberration curves of the fifth embodiment of the present invention. The fifth embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, the object-side surface 21 and the image-side surface 22 of the second lens element 20 are aspheric, and inflection points are formed on the object-side surface 21.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a concave object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

An image plane 70 is located behind the IR cut filter 60.

The equation for the aspheric surface profiles of the fifth embodiment has the same form as that of the first embodiment.

In the fifth embodiment of the present optical lens system for taking image, the focal length of the optical lens system for taking image is f, the focal length of the first lens element is f1, the focal length of the third lens element is f3, the focal length of the fourth lens element is f4, the focal length of the first lens element and the second lens element combined is f12, the on-axis distance between the first lens element and the second lens element is T12, the on-axis distance between the second lens element and the third lens element is T23, the on-axis distance between the third lens element and the fourth lens element is T34, and they satisfy the relations:

$f=6.28$ mm;

$f/f12=1.33$;

$f/f1=2.24$;

$f/f3=0.81$;

$|f/f4|=1.17$;

$(T12/f)*100=0.8$;

$(T23/f)*100=12.8$;

$(T34/f)*100=9.5$.

In the fifth embodiment of the present optical lens system for taking image, the refractive index of the first lens element is N1, the refractive index of the second lens element is N2, and they satisfy the relations:

$N1=1.544$;

$N2=1.621$;

$|N1-N2|=0.077$.

In the fifth embodiment of the present optical lens system for taking image, the Abbe number of the first lens element is V1, the Abbe number of the second lens element is V2, and they satisfy the relation:

$|V1-V2|=31.5$.

In the fifth embodiment of the present optical lens system for taking image, the focal length of the optical lens system for taking image is f, the radius of curvature of the object-side surface of the first lens element is R1, the radius of curvature of the object-side surface of the second lens element is R3, the radius of curvature of the image-side surface of the second lens element is R4, and they satisfy the relations:

$R1/f=0.30$;

$(R3+R4)/(R3-R4)=-0.29$.

In the fifth embodiment of the present optical lens system for taking image, the distance from the aperture stop of the optical lens system for taking image to the image plane is DT, the maximum image height of the optical lens system for taking image is ImgH, and they satisfy the relation:

$DT/ImgH=1.77$. And an object to be photographed is imaged on the electronic imaging sensor.

The detailed optical data of the fifth embodiment is shown in table 9, and the aspheric surface data is shown in table 10, wherein the units of the radius of curvature, the thickness and the focal length are expressed in mm, and HFOV is half of the maximal field of view

TABLE 9

(Embodiment 5)
f(focal length) = 6.28 mm, Fno =2.85, HFOV (half of field of view) = 31.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.308 | | | | |
| 2 | Lens 1 | 1.89760(ASP) | 1.006 | Plastic | 1.544 | 55.9 | 2.81 |
| 3 | | −6.36710(ASP) | 0.050 | | | | |
| 4 | Lens 2 | −5.18510(ASP) | 0.376 | Plastic | 1.621 | 24.4 | −5.33 |
| 5 | | 9.39710 (ASP) | 0.804 | | | | |
| 6 | Lens 3 | −1.88781(ASP) | 1.568 | Plastic | 1.544 | 55.9 | 7.70 |
| 7 | | −1.68263(ASP) | 0.596 | | | | |
| 8 | Lens 4 | −10.22590(ASP) | 0.831 | Plastic | 1.530 | 55.8 | −5.35 |

TABLE 9-continued (Embodiment 5)
f(focal length) = 6.28 mm, Fno =2.85, HFOV (half of field of view) = 31.2 deg.

| Surface # | | Curvature Radius | Thickness | Material | Index | Abbe # | Focal length |
|---|---|---|---|---|---|---|---|
| 9 | | 4.02830(ASP) | 1.200 | | | | |
| 10 | IR-filter | Plano | 0.300 | Glass | 1.517 | 64.2 | |
| 11 | | Plano | 0.322 | | | | |
| 12 | Image | Plano | | | | | |

TABLE 10

Aspheric Coefficients

| Surface # | 2 | 3 | 4 | 5 |
|---|---|---|---|---|
| k= | −2.63432E−01 | −1.26356E+02 | −8.31854E+01 | 3.81373E+01 |
| A4= | 2.87296E−03 | −4.05955E−02 | 2.00227E−02 | 7.71390E−02 |
| A6= | −1.61869E−02 | −1.57366E−02 | −8.54150E−03 | 4.07638E−03 |
| A8= | 1.80880E−02 | 1.91887E−03 | 4.17556E−03 | −8.38807E−03 |
| A10= | −1.54412E−02 | −2.05296E−03 | 3.85904E−03 | 2.25277E−02 |

| Surface# | 6 | 7 | 8 | 9 |
|---|---|---|---|---|
| k= | −1.22189E+00 | −8.08541E−01 | −2.67330E+01 | −1.74675E+01 |
| A4= | −5.65320E−02 | 1.45001E−02 | −2.01101E−02 | −1.99713E−02 |
| A6= | −8.24281E−03 | −3.34731E−03 | 3.93000E−03 | 2.45348E−03 |
| A8= | −3.54986E−03 | 9.79183E−04 | −1.56921E−04 | −2.61699E−04 |
| A10= | 2.69981E−03 | 1.59425E−04 | −1.64668E−05 | 1.18161E−05 |
| A12= | −4.71782E−04 | 3.42930E−05 | 5.97365E−07 | 3.23051E−07 |
| A14= | −2.35259E−05 | −4.78806E−06 | 1.97774E−07 | −1.15837E−08 |
| A16= | 1.45228E−04 | −3.13716E−06 | −2.31158E−08 | −2.79801E−09 |

TABLE 11

| | Embodiment 1 | Embodiment 2 | Embodiment 3 | Embodiment 4 | Embodiment 5 |
|---|---|---|---|---|---|
| f | 6.26 | 6.59 | 5.93 | 6.14 | 6.28 |
| Fno | 2.85 | 2.85 | 2.85 | 2.85 | 2.85 |
| HFOV | 31.1 | 30.0 | 32.5 | 31.7 | 31.2 |
| N1 | 1.544 | 1.544 | 1.544 | 1.544 | 1.544 |
| N2 | 1.632 | 1.608 | 1.632 | 1.632 | 1.621 |
| \| N1 − N2 \| | 0.088 | 0.064 | 0.088 | 0.088 | 0.077 |
| \| V1 − V2 \| | 32.5 | 30.3 | 32.5 | 32.5 | 31.5 |
| f/f12 | 1.33 | 1.29 | 0.96 | 1.03 | 1.33 |
| f/f1 | 2.15 | 2.32 | 1.70 | 1.84 | 2.24 |
| f/f3 | 0.70 | 0.62 | 1.23 | 1.07 | 0.81 |
| \| f/f4 \| | 1.00 | 0.84 | 1.11 | 1.05 | 1.17 |
| (T12/f)*100 | 0.8 | 1.1 | 1.7 | 1.2 | 0.8 |
| (T23/f)*100 | 12.9 | 15.7 | 19.1 | 18.5 | 12.8 |
| (T34/f)*100 | 10.4 | 8.2 | 7.1 | 8.8 | 9.5 |
| R1/f | 0.30 | 0.28 | 0.34 | 0.31 | 0.30 |
| (R3 + R4)/(R3 − R4) | −0.07 | 0.10 | 1.08 | 0.78 | −0.29 |
| DT/ImgH | 1.77 | 1.82 | 1.75 | 1.75 | 1.77 |

In the present optical lens system for taking image, the lens elements can be made of glass or plastic. If the lens elements are made of glass, there is more freedom in distributing the refractive power of the optical lens system. If the lens elements are made of plastic, the cost will be effectively reduced.

It is to be noted that the tables 1-10 show different data from the different embodiments, however, the data of the different embodiments is obtained from experiments. Therefore, any product of the same structure is deemed to be within the scope of the present invention even if it uses different data. Table 11 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from the object side to the image side:
   an aperture stop;
   a first lens element with positive refractive power having a convex object-side surface;
   a plastic second lens element with negative refractive power having a concave object-side surface and a concave image-side surface, the object-side and the image-side surfaces of the second lens element being aspheric;
   a third lens element with positive refractive power having a concave object-side surface and a convex image-side surface;
   a fourth lens element with negative refractive power having a convex object-side surface and a concave image-side surface; and
   in the optical lens system for taking image, the number of lens elements with refractive power being limited to four;
   wherein a radius of curvature of the object-side surface of the second lens element is R3, a radius of curvature of the image-side surface of the second lens element is R4, they satisfy the relation:

−0.40<(R3+R4)/(R3−R4)<0.85.

2. The optical lens system for taking image as claimed in claim 1, wherein the third lens element is made of plastic material, the object-side surface and the image-side surface of the third lens element are aspheric, the fourth lens element is made of plastic material, the object-side surface and the image-side surface of the fourth lens element are aspheric, and inflection points are formed on the fourth lens element.

3. The optical lens system for taking image as claimed in claim 2, wherein an image-side surface of the first lens element is convex, a focal length of the optical lens system for taking image is f, an on-axis distance between the first lens element and the second lens element is T12, an on-axis distance between the second lens element and the third lens element is T23, and they satisfy the relations:

$(T12/0*100>0.4,$ $0.4<$ $(T23/f)*100<25.$

4. The optical lens system for taking image as claimed in claim 3, wherein the radius of curvature of the object-side surface of the second lens element is R3, the radius of curvature of the image-side surface of the second lens element is R4, they satisfy the relation:

$-0.35<(R3+R4)/(R3-R4)<0.50.$

5. The optical lens system for taking image as claimed in claim 4, wherein the radius of curvature of the object-side surface of the second lens element is R3, the radius of curvature of the image-side surface of the second lens element is R4, they satisfy the relation:

$-0.09<(R3+R4)/(R3-R4)<0.15.$

6. The optical lens system for taking image as claimed in claim 2, wherein the first lens element is made of plastic material, the object-side surface and an image-side surface of the first lens element are aspheric, inflection points are formed on the object-side surface of the second lens element, a focal length of the optical lens system for taking image is f, an on-axis distance between the third lens element and the fourth lens element is T34, and they satisfy the relation:

$3.5<(T34/f)*100<12.$

7. The optical lens system for taking image as claimed in claim 2, wherein a distance from the aperture stop of the optical lens system for taking image to an image plane is DT, a maximum image height of the optical lens system for taking image is ImgH, they satisfy the relation:

$DT/ImgH<2.0,$ and an object to be photographed is imaged on an electronic imaging sensor.

8. The optical lens system for taking image as claimed in claim 1, wherein a refractive index of the first lens element is N1, a refractive index of the second lens element is N2, they satisfy the relation:

$|N1-N2|<0.108,$ an Abbe number of the first lens element is V1, an Abbe number of the second lens element is V2, and they satisfy the relation:

$|V1-V2|>23.$

9. The optical lens system for taking image as claimed in claim 1, wherein a focal length of the optical lens system for taking image is f, a radius of curvature of the object-side surface of the first lens element is R1, and they satisfy the relation:

$0<R1/f<0.4.$

10. The optical lens system for taking image as claimed in claim 9, wherein the focal length of the optical lens system for taking image is f, the radius of curvature of the object-side surface of the first lens element is R1, and they satisfy the relation:

$0<R1/f<0.32.$

11. The optical lens system for taking image as claimed in claim 1, wherein a refractive index of the second lens element is N2, and it satisfies the relation:

$1.55<N2<1.64.$

* * * * *

UNITED STATES PATENT AND TRADEMARK OFFICE
CERTIFICATE OF CORRECTION

| | | |
|---|---|---|
| PATENT NO. | : 7,957,079 B2 | Page 1 of 1 |
| APPLICATION NO. | : 12/977063 | |
| DATED | : June 7, 2011 | |
| INVENTOR(S) | : Hsiang-Chi Tang | |

It is certified that error appears in the above-identified patent and that said Letters Patent is hereby corrected as shown below:

In line 8, Claim 3, page 21:

$(T12/0*100>0.4$ should be $(T12/f)*100>0.4$

In lines 9-10, Claim 3, page 21:

$0.4<$ $(T23/f)*100<25$ should be $0.4<(T23/f)*100<25$

Signed and Sealed this
Twelfth Day of June, 2012

David J. Kappos
*Director of the United States Patent and Trademark Office*